United States Patent
Aggour et al.

(10) Patent No.: US 9,852,390 B2
(45) Date of Patent: Dec. 26, 2017

(54) METHODS AND SYSTEMS FOR INTELLIGENT EVOLUTIONARY OPTIMIZATION OF WORKFLOWS USING BIG DATA INFRASTRUCTURE

(71) Applicant: General Electric Company, Schenectady, NY (US)

(72) Inventors: Kareem Sherif Aggour, Niskayuna, NY (US); Jenny Marie Weisenberg Williams, Niskayuna, NY (US)

(73) Assignee: GENERAL ELECTRIC COMPANY, Schenectady, NY (US)

(*) Notice: Subject to any disclaimer, the term of this patent is extended or adjusted under 35 U.S.C. 154(b) by 875 days.

(21) Appl. No.: 14/297,351

(22) Filed: Jun. 5, 2014

(65) Prior Publication Data
US 2015/0356485 A1 Dec. 10, 2015

(51) Int. Cl.
*G06Q 10/06* (2012.01)

(52) U.S. Cl.
CPC .............. *G06Q 10/06316* (2013.01)

(58) Field of Classification Search
CPC ........... G06N 5/04; G06N 7/005; G06N 5/02; G06N 99/005; G06Q 10/06316; G06F 17/30318
USPC .......................................................... 706/12
See application file for complete search history.

(56) References Cited

U.S. PATENT DOCUMENTS

| | | | |
|---|---|---|---|
| 2008/0027782 A1* | 1/2008 | Freire ................. | G06F 9/4443 705/7.26 |
| 2008/0040181 A1* | 2/2008 | Freire ............. | G06Q 10/06316 705/7.26 |
| 2014/0215487 A1* | 7/2014 | Cherkasova ......... | G06F 9/5083 718/106 |
| 2016/0364211 A1* | 12/2016 | Chau ....................... | G06F 8/35 |

* cited by examiner

*Primary Examiner* — Dave Misir
(74) *Attorney, Agent, or Firm* — Buckley, Maschoff & Talwalkar LLC

(57) ABSTRACT

Methods and systems for optimizing the configuration and parameters of a workflow using an evolutionary approach augmented with intelligent learning capabilities using a Big Data infrastructure. In an embodiment, a Big Data infrastructure receives workflow input parameters, an objective function, a pool of initial configuration parameters, and completion criteria from a client computer, and then runs multiple instances of a workflow based on the pool of initial configuration parameters resulting in corresponding output results. The process includes storing the workflow input parameters and the corresponding output results, modeling the relationship between changes in the workflow input parameters and the corresponding output results, determining that optimal output results have been achieved, and then transmitting the optimal output and the input-output variable relationships results to the client computer.

20 Claims, 3 Drawing Sheets

METHODS AND SYSTEMS FOR INTELLIGENT EVOLUTIONARY OPTIMIZATION OF WORKFLOWS USING BIG DATA INFRASTRUCTURE

BACKGROUND

Embodiments generally relate to providing methods and systems for optimizing the configuration and parameters of a workflow using an evolutionary approach augmented with intelligent learning capabilities using Big Data infrastructure.

The term "Big Data" is generally used to describe the voluminous amount of data, often semi-structured or unstructured, that would take too much time and/or be too costly to load into a traditional database for analysis. Although Big Data doesn't refer to any specific quantity, the term is often used with regard to terabytes or more of data. Often, the goal of a company when attempting to analyze Big Data is to try to discover repeatable business patterns.

Recently, Big Data analysis has been associated with the open source technology Apache Hadoop because the analysis of large datasets requires a software framework, such as "Hadoop MapReduce," that allows developers to write programs to process large amounts of data in a highly parallel manner Such parallel processing can be distributed among tens, hundreds, or even thousands of computers, and typically involves utilizing workflows that permit users to run a predefined sequence of steps to produce a final result. Each step in the workflow can run specialized algorithms, and each of the algorithms may require configuration, for example, in the form of Boolean, numeric, ordinal, or categorical parameters. Thus, for a workflow that includes many steps in an analysis pipeline, each with many configuration parameters, a large number of unique parameter combinations may exist that could be run, which each produces a different result in the solution space. Scenarios exist wherein a user (such as a researcher) does not know the optimal combination of input parameters across the many steps in the workflow.

To address the challenge of identifying an optimal combination of input parameters, a user could design experiments within a Big Data infrastructure to execute a large number of iterations of the same pipeline in parallel (at the same time), with each instance using slightly different input parameters. For example, evolutionary algorithms and/or approaches exist that attempt to optimize the parameters of an analytic, and these are often referred to as "hill-climbing" algorithms. Evolutionary processes rely on random permutations of parameters for generating new solutions to evaluate to, in effect, stumble upon even better solutions. Such approaches are time consuming, can be expensive, and may not be feasible in some cases given the available computer resources, which may not allow for all possible permutations to be run for every possible parameter combination in the search space.

For example, a traditional genetic software process utilizes a "chromosome" (effectively an array) of values, one value per configurable input parameter. Each chromosome therefore represents a complete set of initial conditions of a workflow to be evaluated. Initially, a random population (collection) of chromosomes is constructed and evaluated by executing the complete workflow with those initial conditions, and a quality score is assigned to each chromosome based on the quality of the output of the workflow generated with that chromosome's initial conditions. The top chromosome(s) are automatically copied to the next generation of the population, so as not to lose the best solution(s). The rest of the population is sampled and randomly mutated (or pairs would be sampled and merged or "crossed-over") to produce a population of new initial conditions to evaluate. In this sampling process, chromosomes with better scores would be more likely to be selected for the crossover or mutation operations. In a conventional genetic software optimization process, the previous population of chromosomes is discarded after each generation of the evolutionary computation, causing the system to "forget" the vast majority of parameter combinations tried.

The present inventors therefore recognized opportunities for providing methods and systems for providing an intelligent evolutionary process for optimizing workflows that learn what parameter combinations are most likely to produce satisfactory outputs, while also recognizing and noting what parameter changes have a positive, negative, or limited impact on the outcome, to optimize workflows to produce the desired results.

BRIEF DESCRIPTION

Systems and methods are presented for optimizing the configuration and parameters of a workflow using an evolutionary approach augmented with intelligent learning capabilities using a Big Data infrastructure. In an embodiment, a Big Data infrastructure receives workflow input parameters, an objective function, a pool of initial configuration parameters, and completion criteria from a client computer, and then runs multiple instances of a workflow based on the pool of initial configuration parameters to result in corresponding output results. The process includes storing the workflow input parameters and the corresponding output results, modeling the relationship between changes in the workflow input parameters and the corresponding output results, determining that optimal output results have been achieved, and then transmitting the optimal output results and the input-output variable relationships to the client computer.

In some embodiments, an apparatus includes a processor and a memory in communication with the processor. The memory stores program instructions, and the processor is operative with the program instructions to perform functions as set forth in the preceding paragraph.

DETAILED DESCRIPTION

Figure 1:
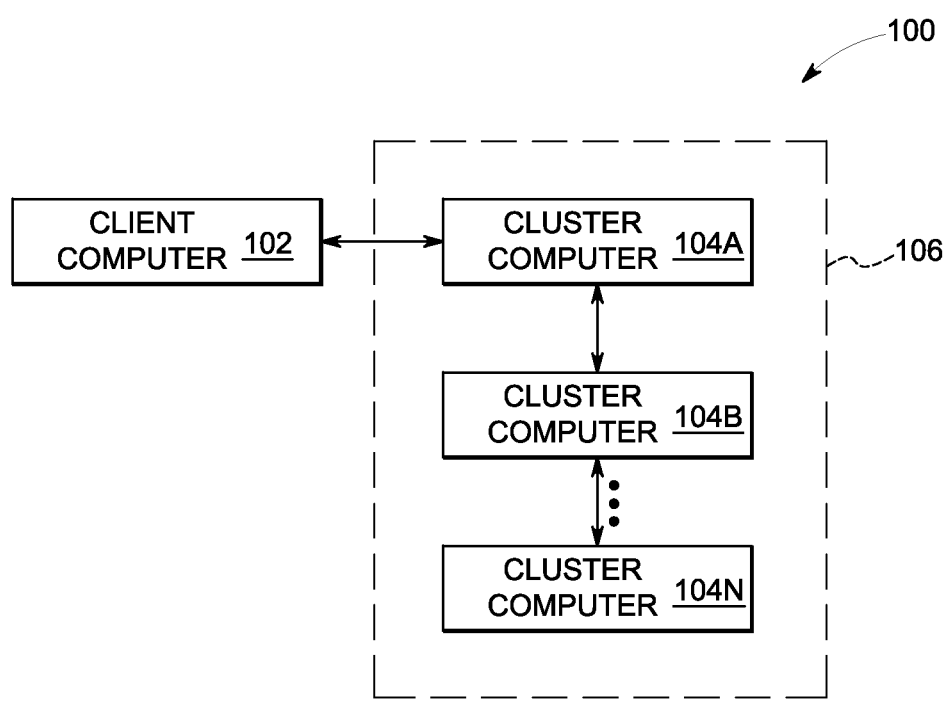
FIG. 1 is a block diagram of a system architecture for running an intelligent evolutionary optimization workflow process in a Big Data environment according to an embodiment.

Apparatus and processes are disclosed that permit users, such as researchers, to execute an intelligent evolutionary workflow optimization process running on a Big Data environment that selects a subset of workflow input parameter combinations to evaluate, and then over time models the relationships between changes in the input variables to changes in the output values to gain insights into which input parameter changes have the most impact and which have the least impact regarding the overall quality of the results. Thus, modifications to a setting for certain parameters that frequently yield good results can be incorporated into a greater number of future workflow runs within the Big Data infrastructure, while the parameter settings that do not improve the output can be pruned from the solution search space. Thus, the key subset of parameter combinations are identified that have the most impact on the final output quality, which can be used to achieve better results faster and with less computational resources. The user is thus able to achieve the desired results with a minimum amount of iterations.

In some embodiments, provided is an evolutionary optimization workflow process for use by a computer system in which successive sets of workflow runs are executed in parallel in a Big Data infrastructure, each with different sets of input parameters in order to identify which input parameter combinations outperform others. The intelligent workflow process builds an understanding over time of how the input parameters correlate to the accuracy of the output. This process permits the system to more quickly identify which are the likely better parameter combinations to explore. In contrast, traditional approaches involve selecting the input parameters from the best intermediate solutions and then randomly permuting or mutating elements of that input parameter set.

In some implementations of the disclosed processes, the initial input parameter combinations and/or the early iterations of parameter combinations may be randomized, or may be based on the best guesses of domain experts. Then, based on the results of the early iterations, in some embodiments a determination is made concerning which changes to certain parameter settings do not improve the output. The subset of the possible solution space containing variations to that particular parameter (or those particular parameters) can then be ignored in future workflow process runs. Such processing effectively "prunes" the parameter combination tree or shrinks the solution search space. In other words, the system learns which parameter(s) have little or no influence on the workflow solution, and therefore does not generate new parameter combinations that vary that particular parameter(s), reducing the total number of parameter combinations the system would possibly attempt to evaluate.

In some embodiments, the intelligent evolutionary optimization workflow process also determines what changes to a particular parameter frequently yields improved results. Accordingly, such changes can then be incorporated into a greater number of future workflow process runs on the computer system within the Big Data infrastructure. In some implementations, the iterations are stopped when a predetermined quality or accuracy of output results is achieved, and/or when there has not been an improvement in the output after some number of iterations, and/or when time and/or computer resources are expended.

The system utilizes an objective function to evaluate the quality of the results. The objective function is entirely dependent on the application, and is used to provide a quantitative score of the "goodness" or usefulness of the output that has been generated for a specific set of initial conditions. For example, if the goal of a biomedical workflow is to classify images as showing normal tissue or as showing cancerous tissue, then a set of labeled images could be used to evaluate the workflow and the objective function could sum the number of correct classifications. In other example implementations, the objective function may perform a more complex scoring function, which may be based on the number of true negative and/or false positive classifications. Such a complex scoring function may depend upon one type of error being considered more harmful than another type of error (i.e., a penalty to the overall objective function score may be less for classifying a normal tissue sample as cancerous, but the penalty may be higher for classifying a cancerous tissue as normal).

The embodiments disclosed herein are set forth to aid in an understanding of the subject matter of this disclosure, but are not intended to, and should not be construed to limit in any way the claims appended hereto. Therefore, while specific terminology is employed for the sake of clarity in describing some exemplary embodiments, the present disclosure is not intended to be limited to the specific terminology so selected, and it is to be understood that each specific element includes all technical equivalents which operate in a similar manner.

FIG. 1 is a block diagram of an intelligent evolutionary workflow optimization system 100 according to some embodiments. Thus, FIG. 1 illustrates an example of a logical Big Data infrastructure for describing workflow methods and systems regarding an intelligent evolutionary optimization workflow process, and other intelligent evolutionary workflow optimization system implementations could also be utilized that include more or less and/or different components than those shown in FIG. 1, and such components could be arranged in different manner. As explained above, the intelligent workflow process selects a subset of parameter combinations to evaluate, and then evaluates the results over time to gain insights into what input parameter changes have the most impact and which input parameter changes have the least impact concerning the overall quality of the results.

Referring again to FIG. 1, a client or user computer 102 is operably connected to a cluster 106 that includes a plurality of cluster computers 104A, 104B to 104N. The cluster 106 would be used for storing and analyzing very large amounts of unstructured data, such as Big Data, in a distributed computing environment. For example, a Big Data computer cluster may run the Apache Hadoop open source distributed data storage and parallel processing software framework on low-cost commodity computers. The Hadoop software is designed to run on a large number of computers that do not share any memory or disks, wherein each cluster computer runs the Hadoop software. When Big Data is loaded into the Hadoop cluster, the software separates the data into pieces, spreads the data across the different computer servers, and keeps track of where the data resides. Copies are stored on multiple cluster server computers, so that if one of the cluster server computers goes offline, the data that was stored on that offline cluster server computer is not lost. Users of the cluster 106 may include, for example, researchers desiring to process vast amounts of genomic data and/or other large scientific data sets quickly and efficiently, advertisers wishing to analyze click stream data in order to segment users and understand user preferences, and/or internet service provider (ISP) personnel wishing to process log data generated by Internet and/or mobile applications to determine useful insights about such applications and/or their customers.

In a centralized database system, typically one big disk (a large storage device) is connected to a fixed number such as four or eight or sixteen processors, and that is the limit of the processing power that can be utilized. In contrast, in a Hadoop cluster each cluster server computer typically has a smaller number such as two or four or eight central processing units (CPUs), but the cluster as a whole is comprised of many, many nodes, resulting in much more computational power than a single large server. When code is to be executed, it is transmitted to each of the cluster server computers of the Hadoop cluster, and each cluster server computer runs the code on its own piece of the data and the results are then delivered back in a unified whole. In other words, the operation is mapped out to all of the cluster server computers and then the results are reduced back into a single result set. Thus, Big Data can be handled by the cluster server computers of the Hadoop cluster because the data is distributed, and complicated computational results can be obtained because the plurality of processors of the cluster server computers work together in parallel.

Hadoop clusters are therefore typically utilized to boost the speed of data analysis applications, and are highly scalable. In particular, new nodes can be added as needed, and can be added without needing to change data formats, how data is loaded, how jobs are written, or the applications on top. Thus, if a Hadoop cluster's processing power is overwhelmed by growing volumes of data, additional cluster nodes (cluster server computers) can be added to increase the storage and analysis throughput. Hadoop clusters are also cost effective, as they allow massively parallel computing on commodity servers, resulting in a sizeable decrease in the cost per terabyte of storage (which makes it affordable to store and analyze Big Data). Furthermore, a Hadoop cluster is also highly resistant to failure because each piece of data is copied onto multiple cluster nodes, which ensures that the data is not lost if one node fails.

Referring again to FIG. 1, in some embodiments described herein, a cluster user utilizes the client computer 102 to define the workflow, and to define the input parameters to tune, their data types (such as Boolean, integer, and the like), and their valid ranges. The user also utilizes the client computer 102 to define an objective function(s), which measures workflow accuracy and/or quality, and completion criteria. Lastly, the user optionally defines an initial pool of initial conditions. The client computer 102 then transmits the workflow with a run request to initiate parallel processing on the Hadoop cluster 106. The run request in this example includes the input parameters, data types, objective function(s), initial conditions and completion criteria (if required), so that processing of a predetermined Big Data dataset can commence on the Hadoop cluster 106. The Hadoop cluster 106 receives the run request from the client computer 102, and then runs parallel workflows on the selected Big Data dataset based on the input parameters and the objective function(s), stores the input parameter set and the output (e.g., historical run information), and models relationships between inputs and outputs across all of the historical and current run results. The workflow process instructions cause the Hadoop cluster 106 to identify and/or develop an updated pool of inputs to test, and to determine whether or not the target accuracy and/or other completion criteria have been met. If the target accuracy and/or completion criteria have not been met, then the workflow is run again (e.g. the workflow process loops back) using the updated pool of inputs. When the target accuracy has been achieved, and/or when the completion criteria are satisfied, the Hadoop cluster 106 transmits the results to the client computer 102 and also stores the results for possible future use. Completion criteria may include, but are not limited to, halting the intelligent evolutionary optimization workflow process when the accuracy (i.e., an accuracy score or indication(s)) has not improved after some fixed number of runs (such as 10 runs), or when the system has completed a set number of iterations (such as 10,000).

A representative use case for the intelligent evolutionary workflow processes described herein may include a digital pathology platform that includes an image analysis pipeline consisting of specialized software processes, such as an image segmentation process (identifying different types of cells and cellular compartments within an image), a normalization process (across different images in a given microscope slide), and a biomarker quantification process (to quantify the expression levels of a set of biomarkers in a region of the image). Each of these steps is configurable via a set of parameters to optimize the workflows. Parameters are typically numeric, Boolean, or categorical values, for example, a segmentation routine may have a configurable numeric parameter P1 affecting whether a region of the image gets identified as nucleus or cytoplasm, or configurable Boolean parameter P2 indicating whether or not to apply a particular filter to the images. However, because tissue and image characteristics vary significantly from study to study, it is likely that the digital pathology platform user will not know ahead of time which parameter set will produce the best workflow process results for a particular set of images. Thus, the workflow pipeline would often need to be run multiple times, with various parameter combinations, to assess which parameter value combination(s) yield the best outputs. The intelligent evolutionary optimization workflow processes described herein provide a mechanism to do this in an efficient and automated manner. In this case, optimal output may be a correct classification of images of cancerous versus normal tissue. Completion criteria could be a threshold of classification correctness, for example classifying 95% of a previously-labeled population of images correctly. Alternatively, when developing a screening test it may be critical to identify all potentially cancerous patients for further testing, and therefore a completion criteria may be zero percent (0%) false negatives and less than twenty percent (20%) false positives. Completion criteria could also include a fixed number of iterations (e.g., 1,000 iterations) such that the routine can reach a stopping point even if the classification goals mentioned above could not be achieved. Finally, after the routine is complete, the user may be presented with information about the effects of the various input parameters on the outputs, for example, varying P2 had a significant effect on the outputs, but varying P1 had negligible effect. The user could then use this information to perhaps initiate further runs with different values of P2, and/or simplify the workflow by setting P1 to a constant value rather than retaining it as a configurable parameter.

Figure 2:
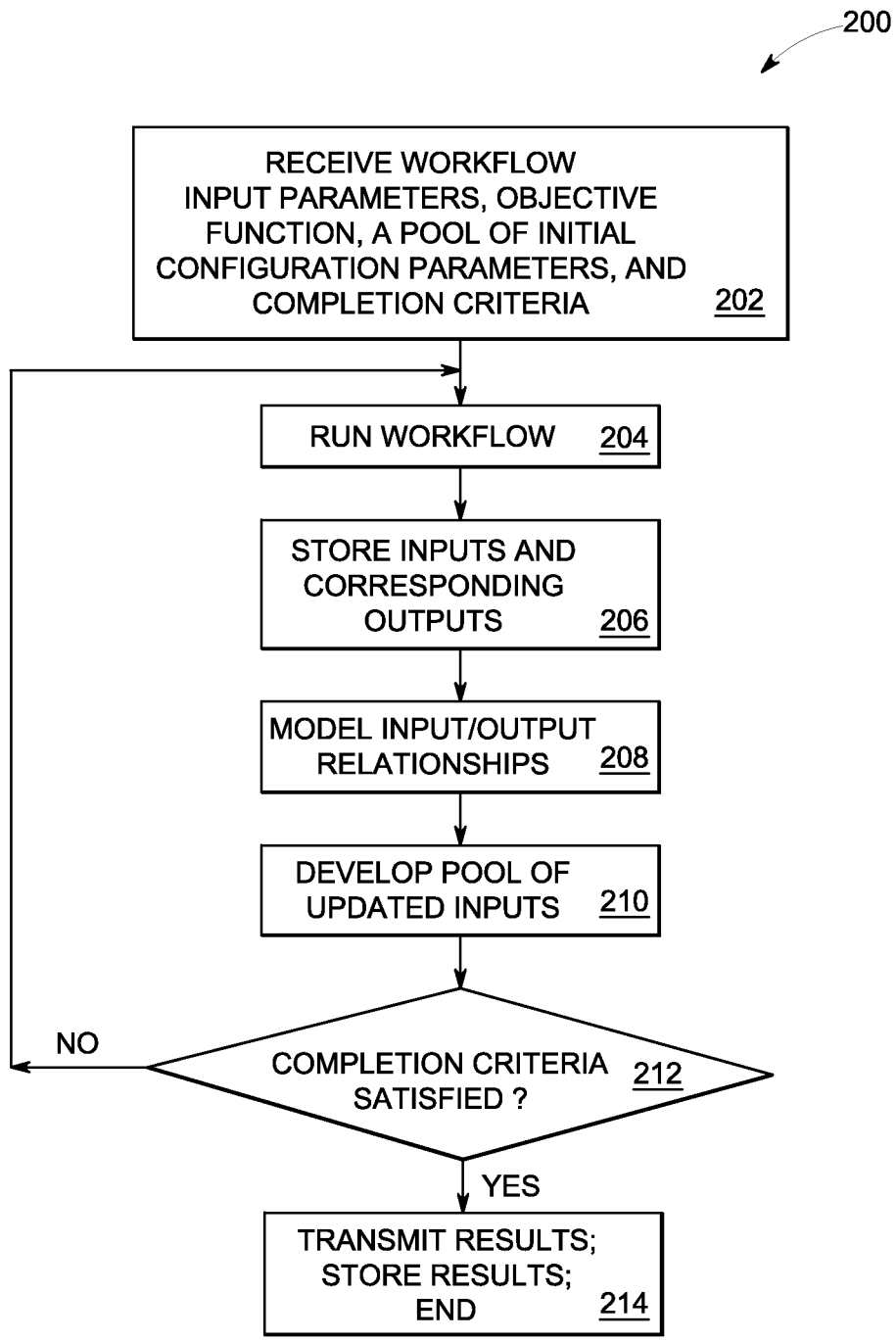
FIG. 2 is a flow diagram of an intelligent evolutionary optimization workflow process for analzing Big Data according to some embodiments.

FIG. 2 is a flowchart 200 of a method for optimizing workflows using Big Data infrastructure according to some embodiments. Before processing occurs, a user initially configures the workflow software program by defining the workflow to optimize, selects the parameters to optimize, and sets minimum and maximum ranges for each parameter. The user also provides an objective function with which to quantify the quality of the workflow output, completion criteria, and may optionally also provide a "best-guess" set of initial configuration parameters to be used as a baseline. The completion criteria may consist of a predetermined output accuracy score, which can be based on the objective function, and/or may include halting the workflow process when no further improvement in the output results occurs, and/or halting the workflow process when a predetermined computer run time limit expires.

Referring to FIG. 2, a computer network (such as the Hadoop cluster 106 of FIG. 1) receives 202 workflow input parameters, a workflow objective function, and a pool of initial configuration parameters (or initial conditions). The computer network then runs 204 the workflow, stores 206 the inputs and corresponding outputs in a non-transitory storage device, models 208 the input/output relationships, and develops 210 a pool of updated or new inputs. The inputs and outputs may be stored in different types of storage media depending on the needs of the end user, including in a relational database, in flat files, or in some other structure. The modeling of the input/output relationships can be performed using a variety of techniques. For example, Linear regression, singular value decomposition, and/or other statistical or parametric techniques could be used to model which input changes influence the output the most. Finally, each input parameter configuration may be scored based on the accuracy of the output, and in some implementations the system can use Monte Carlo-style random selection of which input parameters to select for crossover or mutation, which could be weighted based on the accuracy of the output those input parameters created. Once a single or a pair of input parameters has been selected, the system will use the results of the modeling in the previous step to determine which parameters to adjust when generating a new input parameter set to evaluate. Next, the computer network determines 212 if the completion criteria have been satisfied and if so, then transmits 214 the results to the client computer 102 (FIG. 1) for review by the user. The computer network also stores 214 the results and the input parameter set(s) for the user to be able to revisit the analysis and study what parameter changes impact the overall workflow performance, and possibly for use in future workflow runs, and the process ends.

In most cases, the completion criteria will not be satisfied after an initial run of any particular workflow process, and therefore in step 212 when the completion criteria are not satisfied the process branches back to step 204 wherein the workflow process is run again with the pool of new or updated inputs that were developed in step 210. Thus, in some implementations, the process includes running an analysis pipeline multiple times, each time dynamically choosing the parameters for the next run or iteration based on the outcomes of previous runs. Finally, after multiple workflow runs, the completion criteria are satisfied 212 and the optimal output is then transmitted 214 to the user, along with what has been learned about what parameters influence the objective function and in which direction.

The flow charts and descriptions thereof herein should not be understood to prescribe a fixed order of performing the method steps described therein. Rather, the method steps may be performed in any order that is practicable. For example, in FIG. 2 the computer network may develop 210 a pool of updated or new inputs after it is determined that the completion criteria 212 were not satisfied. In addition, the flow charts described herein should not be understood to require that all steps or elements be practiced in every embodiment. For example, one or more elements or steps may be omitted in some embodiments.

In addition to providing an optimal output, a technical effect of the process 200 for optimizing workflows using a Big Data infrastructure is that the user is provided with information concerning the parameter changes that most improved the outcome of the workflow pipelines. The user thus can learn which parameters most impacted the pipelines, and thus may use this information to manually adjust the parameters at a later date when the same (or similar) workflow process is run again. In particular, the user has a good sense of which parameters to modify, and in which directions, giving him or her greater insight than possible using conventional evolutionary techniques. Such an approach therefore may yield valuable longer-term information concerning the parameters that are discovered to be influential and/or those parameters that are discovered not to be influential over the course of many workflow runs. Consequently, a further technical effect is that, over the course of many workflow process runs over diverse datasets, when a particular parameter is found to only minimally influence results then that parameter may be automatically eliminated from the parameter set presented to the user, which simplifies the workflow process.

Figure 3:
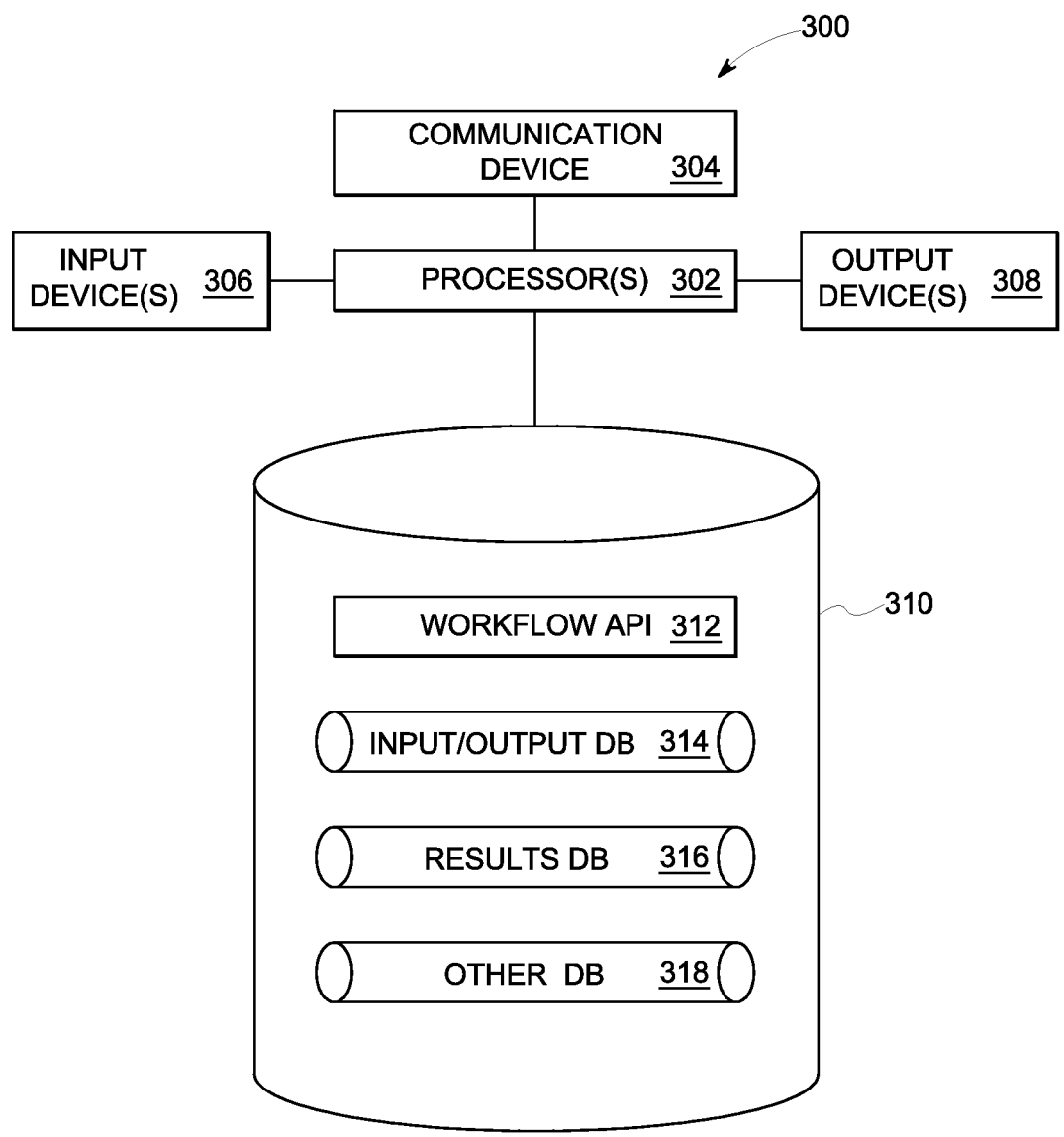
FIG. 3 is a block diagram of a server computer for running an intelligent evolutionary optimization workflow process for analyzing Big Data according to some embodiments.

FIG. 3 is a block diagram of an Intelligent Evolutionary Workflow Optimization server computer 300 for processing workflow run requests according to some embodiments. The Intelligent Evolutionary Workflow Optimization server computer 300 may be conventional in its hardware aspects but may be controlled by software to cause it to operate in accordance with aspects of the methods presented herein. In particular, the Intelligent Evolutionary Workflow Optimization server computer 300 may include one or more processors 302 operatively coupled to a communication device 304, one or more input devices 306, one or more output devices 308, and a non-transitory storage device 310. In some embodiments, the Intelligent Evolutionary Workflow Optimization server computer 300 is one of the plurality of cluster server computers 104 shown in FIG. 1.

The processor 302 may constitute a plurality of conventional processors that may operate in parallel, and such processors may be manufactured by companies such as Intel Corporation and the like. Processor 302 operates to execute processor-executable steps, contained in program instructions described herein, so as to control the Intelligent Evolutionary Workflow Optimizing server computer 300 to provide desired functionality.

Communication device 304 may be used to facilitate communication with, for example, other devices (such as for receiving workflow run requests that include input parameters, objective functions, completion criteria and the like from client computers, and for transmitting results data to one or more client computers). Communication device 304 may also, for example, have capabilities for engaging in data communications over conventional computer-to-computer data networks, including the Internet, in a wired or wireless manner. Such data communications may be in digital form and/or in analog form.

Input device 306 may comprise one or more of any type of peripheral device typically used to input data into a computer. For example, the input device 306 may include a keyboard and a mouse and/or a touchpad that may be used, for example, by a systems engineer or other personnel authorized to, for example, perform Intelligent Evolutionary Workflow Optimizing server computer system maintenance or other tasks. The output device 308 may comprise, for example, conventional output components such as a display and/or a printer.

The non-transitory storage device 310 may comprise any appropriate information storage device, including combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory devices. Any one or more of the listed storage devices may be referred to as a "computer readable medium", "memory", "storage", or "storage medium". The non-transitory storage device 310 stores one or more programs for controlling processor 302. The programs comprise program instructions that contain processor-executable process steps of the Intelligent Evolutionary Workflow Optimizing server computer 300, including, in some cases, process steps that constitute processes provided in accordance with principles of the processes presented herein.

The programs may include a Workflow application programming interface (API) 312 that manages a process by which workflows are optimized. In some embodiments, the Workflow API 312 operates to receive a workflow request that includes a workflow, workflow input parameters, their data types and valid ranges, an objective function, and an optional pool of initial configuration parameters (or initial conditions). The Workflow API 312 may be configured to cause the processors 302 in the context of a Big Data infrastructure (such as that shown in FIG. 1) to run the workflow in parallel once for each input parameter combination, store the inputs and corresponding outputs in an Input/Output data storage medium 314, model the input/output relationships, and develop a pool of updated inputs. Possible data storage media include, but are not limited to, a relational database, a single flat file, or set of flat files stored in a Hadoop Distributed File System distributed across the Big Data infrastructure. In some implementations, the Workflow API 312 also causes the processor(s) 302 to determine if the completion criteria have been satisfied and if so, to transmit the results via the communication device 304 to the client computer 102 (FIG. 1) for review by the user. In this case, the Big Data infrastructure also stores the results and the input parameter set in a Results data store 316 for possible use for future workflow runs.

As mentioned above, the storage device 310 may also include an Input/Output data store 314, which may include the inputs and associated outputs from the many workflow runs that may be utilized to determine updated input parameter sets for additional workflow runs. A Results data store 316 may also exist for storing the input parameter sets and associated results for particular workflows, from which input parameter sets could be derived for future workflow runs. In addition, other data stores 318 may be maintained by the Intelligent Evolutionary Workflow Optimizing server computer 300 on the storage device 310.

Application programs of the Intelligent Evolutionary Workflow Optimization server computer 300 may be combined in some embodiments, as convenient, into one, two, or more application programs. Moreover, the non-transitory storage device 310 may store other programs or applications, such as one or more operating systems, device drivers, database management software, web hosting software, and the like.

Accordingly, the systems and methods disclosed herein benefit users by eliminating the need to manually invoke each of the workflow process runs with different initial conditions in a Big Data infrastructure one at a time. Instead, the Intelligent Evolutionary Workflow Optimization process automatically tracks the relationship(s) between changes to the input parameters and the outputs, and provides decisions regarding which parameter settings to try next during additional workflow runs. Thus, a technical effect is that a smaller number of runs (a faster approach) are needed to optimize the parameters of a complex analysis pipeline to achieve optimized workflow results. Obtaining optimal results with fewer iterations reduces the time, effort, and computing expenses required. Such considerations may become particularly important when executing simulation optimizations in a cloud-based environment where reduced runtimes directly translates into less cost.

The figures represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may include any number of hardware and/or software elements suitable to provide the functions described herein as well as any other functions. For example, any computing device used in an implementation of some embodiments may include a processor to execute program code such that the computing device operates as described herein.

All systems and processes discussed herein may be embodied in program code stored on one or more non-transitory computer-readable media. Such computer-readable media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein and/or depicted in the figures are solely for the purpose of illustration. A person of ordinary skill in the relevant art may recognize other embodiments that may be practiced with various modifications and/or alterations to that described herein.

What is claimed is:

1. A computer-implemented method for intelligent evolutionary optimization of a workflow, comprising:

receiving, by a Big Data infrastructure from a client computer, a run request comprising workflow input parameters, an objective function, a pool of initial configuration parameters, and completion criteria;

running, by the Big Data infrastructure, multiple parallel instances of a workflow based on the pool of initial configuration parameters resulting in corresponding parallel output results;

storing, by the Big Data infrastructure, the workflow input parameters and the corresponding output results;

modeling, by the Big Data infrastructure utilizing at least one of a statistical technique and a parametric technique, a relationship between changes in the workflow input parameters and the corresponding output results to gain insights into which input changes have the greatest impact and which input changes have the least impact on quality of the output results;

determining, by the Big Data infrastructure based on at least one of the objective function and the completion criteria as compared to results of the modeling, that optimal output results have been achieved;

tracking by the Big Data infrastructure the relationship between the change in the workflow input parameters and the corresponding output results and providing decisions regarding which workflow input parameters to use during additional workflow run requests which optimize the output results to reduce time, effort and computing expenses; and transmitting, by the Big Data infrastructure, the optimal output results and input-output variable relationships to the client computer.

2. The computer-implemented method of claim 1, further comprising storing, by the Big Data infrastructure, the optimal output results and the workflow input parameters.

3. The computer-implemented method of claim 1, wherein the workflow input parameters and associated output results are stored in one of a relational database, a flat file, or multiple flat files distributed across a cluster.

4. The computer-implemented method of claim 1, wherein modeling the relationship between changes in the workflow input parameters and the corresponding output results comprises utilizing at least one of linear regression and singular value decomposition.

5. The computer-implemented method of claim 1, further comprising, subsequent to modeling the relationship between changes in the workflow input parameters and the corresponding output results:
   scoring each input parameter based on an accuracy of an associated output; and
   selecting at least one input parameter to mutate based on the score.

6. The computer-implemented method of claim 1, wherein the completion criteria comprises at least one of a predetermined output accuracy score based on the objective function, a determination that no further improvement occurs regarding the output results, and a determination that a predetermined computer run time limit expired.

7. The computer-implemented method of claim 1, wherein the optimal output results comprise at least one of a set of scientific data, a set of biomedical images classified as cancerous or normal, a list of power generation equipment and a predicted time to next failure, a list of customers placed into customer segments, a list of finance customers and their associated probability of default scores, and customer insight data.

8. The computer-implemented method of claim 1, further comprising, subsequent to modeling the relationship between changes in the workflow input parameters and the corresponding output results:
   determining, by the Big Data infrastructure, based on at least one of the objective function and the completion criteria, that the optimal output results have not been achieved;
   developing, by the Big Data infrastructure, a pool of updated workflow input parameters;
   running multiple instances of the workflow based on the pool of updated workflow input parameters;
   storing, by the Big Data infrastructure, the updated workflow input parameters and corresponding updated output results;
   modeling, by the Big Data infrastructure utilizing at least one of a statistical technique and a parametric technique, a relationship between changes in the updated workflow input parameters and the corresponding updated output results to gain insights into which input changes have the greatest impact and which input changes have the least impact on quality of the updated output results;
   determining, by the Big Data infrastructure, based on at least one of the objective function and the completion criteria as compared to results of the modeling, that the optimal output results have been achieved; and
   transmitting, by the Big Data infrastructure, the optimal output results and input-output variable relationships to the client computer.

9. The computer-implemented method of claim 8, further comprising, subsequent to modeling the relationship between changes in the updated workflow input parameters and the corresponding updated output results:
   determining, by the Big Data infrastructure, based on at least one of the objective function and the completion criteria, that the optimal output results have not been achieved;
   developing, by the Big Data infrastructure, a second pool of updated workflow input parameters;
   running, by the Big Data infrastructure, multiple instances of the workflow based on the second pool of updated workflow input parameters;
   storing, by the Big Data infrastructure, the second pool of updated workflow input parameters and corresponding second output results;
   modeling, by the Big Data infrastructure utilizing at least one of a statistical technique and a parametric technique, a relationship between changes in the second pool of updated workflow input parameters and the corresponding second output results to gain insights into which input changes have the greatest impact and which input changes have the least impact on quality of the second results;
   determining, by the Big Data infrastructure based on at least one of the objective function and the completion criteria as compared to results of the modeling, that optimal output results have been achieved; and
   transmitting, by the Big Data infrastructure, the optimal output results and input-output variable relationships to the client computer.

10. A non-transitory computer readable medium storing instructions for intelligent evolutionary optimization of a workflow, in which the instructions are configured to cause a processor to:
   receive, from a client computer, a run request comprising workflow input parameters, an objective function, a pool of initial configuration parameters, and completion criteria;
   run multiple parallel instances of a workflow based on the pool of initial configuration parameters resulting in corresponding parallel output results;
   store the workflow input parameters and the corresponding output results;
   model, by utilizing at least one of a statistical technique and a parametric technique, a relationship between changes in the workflow input parameters and the corresponding output results to gain insights into which input changes have the greatest impact and which input changes have the least impact on quality of the output results;
   determine, based on at least one of the objective function and the completion criteria as compared to results of the modeling, that optimal output results have been achieved;
   track the relationship between the change in the workflow input parameters and the corresponding output results and providing decisions regarding which workflow input parameters to use during additional workflow run requests which optimize the output results to reduce time, effort and computing expenses; and
   transmit the optimal output results and input-output variable relationships to the client computer.

11. The non-transitory computer readable storage medium of claim 10, further comprising instructions configured to cause the processor to store the optimal output results.

12. The non-transitory computer readable storage medium of claim 10, wherein the instructions for storing the workflow input parameters and associated output results further comprise instructions configured to cause the processor to store the workflow input parameters and associated output results in one of a relational database, flat file, or multiple flat files distributed across a cluster.

13. The non-transitory computer readable storage medium of claim 10, wherein the instructions for modeling the relationship between changes in the workflow input parameters and the corresponding output results further comprise instructions configured to cause the processor to utilize at least one of linear regression and a singular value decomposition.

14. The non-transitory computer readable storage medium of claim 10, further comprising, subsequent to the instructions for modeling the relationship between changes in the workflow input parameters and the corresponding output results, instructions configured to cause the processor to:
   score each input parameter based on an accuracy of an associated output; and
   select at least one input parameter to mutate based on the score.

15. The non-transitory computer readable storage medium of claim 10, wherein the instructions for determining that optimal output results have been achieved further comprise instructions configured to cause the processor to determine at least one of that a predetermined output accuracy score based on the objective function has been met, that no further improvement has occurred regarding the output results, and that a predetermined computer run time limit expired.

16. The non-transitory computer readable storage medium of claim 10, further comprising, subsequent to the instructions for modeling the relationship between changes in the workflow input parameters and the corresponding output results, instructions configured to cause the processor to:
   determine, based on at least one of the objective function and the completion criteria, that the optimal output results have not been achieved;
   develop a pool of updated workflow input parameters;
   run multiple instances of the workflow based on the updated workflow input parameters;
   store the updated workflow input parameters and corresponding updated output results;
   model, by utilizing at least one of a statistical technique and a parametric technique, a relationship between changes in the updated workflow input parameters and the corresponding updated output results to gain insights into which input changes have the greatest impact and which input changes have the least impact on quality of the updated output results;
   determine, based on at least one of the objective function and the completion criteria as compared to results of the modeling, that the optimal output results have been achieved; and
   transmit the optimal output results and input-output variable relationships to the client computer.

17. The non-transitory computer readable storage medium of claim 16, further comprising, subsequent to the instructions for modeling the relationship between changes in the updated workflow input parameters and the corresponding updated output results, instructions configured to cause the processor to:
   determine, based on at least one of the objective function and the completion criteria, that the optimal output results have not been achieved;
   develop a second pool of updated workflow input parameters
   run multiple instances of the workflow based on the second pool of updated workflow input parameters;
   store the second pool of updated workflow input parameters and corresponding second output results;
   model, by utilizing at least one of a statistical technique and a parametric technique, a relationship between changes in the second pool of updated workflow input parameters and the corresponding second output results to gain insights into which input changes have the greatest impact and which input changes have the least impact on quality of the second output results;
   determine, based on at least one of the objective function and the completion criteria as compared to results of the modeling, that optimal second output results have been achieved; and
   transmit the optimal second output results and input-output variable relationships to the client computer.

18. A system for the intelligent evolutionary optimization of a workflow, comprising:
   a client server computer; and
   a Hadoop cluster comprising a plurality of server computers operably connected to the client server computer;
   wherein the Hadoop cluster operates to:
      receive, from the client computer, a run request comprising workflow input parameters, an objective function, a pool of initial configuration parameters, and completion criteria;
      run multiple instances of a workflow many times in parallel based on the pool of initial configuration parameters resulting in corresponding parallel output results;
      store the workflow input parameters and the corresponding output results;
      model, by utilizing at least one of a statistical technique and a parametric technique, a relationship between changes in the workflow input parameters and the corresponding output results to gain insights into which input changes have the greatest impact and which input changes have the least impact on quality of the output results;
      determine, based on at least one of the objective function and the completion criteria as compared to results of the modeling, that optimal output results have been achieved;
      track the relationship between the change in the workflow input parameters and the corresponding output results and providing decisions regarding which workflow input parameters to use during additional workflow run requests which optimize the output results to reduce time, effort and computing expenses; and
      transmit the optimal output results and input-output variable relationships to the client computer.

19. The system of claim 18, wherein the Hadoop cluster, subsequent to modeling the relationship between changes in the workflow input parameters and the corresponding output results, further operates to:
   determine, based on at least one of the objective function and the completion criteria, that optimal output results have not been achieved;
   develop a pool of updated workflow input parameters;
   run multiple instances of the workflow based on the updated workflow input parameters;
   store the updated workflow input parameters and corresponding updated output results;
   model, by utilizing at least one of a statistical technique and a parametric technique, a relationship between changes in the updated workflow input parameters and the corresponding updated output results to gain insights into which input changes have the greatest impact and which input changes have the least impact on quality of the updated output results;

determine, based on at least one of the objective function and the completion criteria as compared to results of the modeling, that the optimal output results have been achieved; and transmit the optimal output results and input-output variable relationships to the client computer.

20. The system of claim 19, wherein the Hadoop cluster, subsequent to modeling the relationship between changes in the updated workflow input parameters and the corresponding updated output results, further operates to:

determine, based on at least one of the objective function and the completion criteria, that the optimal output results have not been achieved;

develop a second pool of updated workflow input parameters run multiple instances of the workflow based on the second pool of updated workflow input parameters;

store the second pool of updated workflow input parameters and corresponding second output results;

model, by utilizing at least one of a statistical technique and a parametric technique, a relationship between changes in the second pool of updated workflow input parameters and the corresponding second output results to gain insights into which input changes have the greatest impact and which input changes have the least impact on quality of the second output results;

determine, based on at least one of the objective function and the completion criteria as compared to results of the modeling, that optimal second output results have been achieved; and transmit the optimal second output results and input-output variable relationships to the client computer.

\* \* \* \* \*